United States Patent
Hatanaka et al.

(10) Patent No.: US 9,962,904 B2
(45) Date of Patent: *May 8, 2018

(54) SANDWICH STRUCTURE AND INTEGRALLY FORMED ARTICLE USING THE SAME, AND METHODS FOR PRODUCTION THEREOF

(71) Applicant: TORAY Industries, Inc., Tokyo (JP)

(72) Inventors: Kazuhiro Hatanaka, Iyo-gun (JP); Satomi Matsuo, Iyo-gun (JP); Atsuki Tsuchiya, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 14/912,510

(22) PCT Filed: Jul. 17, 2014

(86) PCT No.: PCT/JP2014/068999
§ 371 (c)(1),
(2) Date: Feb. 17, 2016

(87) PCT Pub. No.: WO2015/029634
PCT Pub. Date: Mar. 5, 2015

(65) Prior Publication Data
US 2016/0214346 A1    Jul. 28, 2016

(30) Foreign Application Priority Data

Aug. 30, 2013 (JP) ................................. 2013-178886

(51) Int. Cl.
*B32B 5/12* (2006.01)
*B32B 5/18* (2006.01)
(Continued)

(52) U.S. Cl.
CPC ............ *B32B 5/12* (2013.01); *B29C 44/1228* (2013.01); *B29C 45/1642* (2013.01); *B32B 3/26* (2013.01);
(Continued)

(58) Field of Classification Search
CPC .... B32B 5/12; B32B 3/26; B32B 5/26; B32B 1162/106; B32B 2250/40
See application file for complete search history.

(56) References Cited

U.S. PATENT DOCUMENTS

| 4,770,929 A | 9/1988 | Nobumasa et al. |
| 2004/0213952 A1* | 10/2004 | Takemura ............... B29C 70/34 428/105 |

(Continued)

FOREIGN PATENT DOCUMENTS

| EP | 1 803 551 A1 | 7/2007 |
| JP | 63-060743 A | 3/1988 |

(Continued)

OTHER PUBLICATIONS

Extended European Search Report dated Feb. 10, 2017, in European Patent Application No. 14840735.6.

(Continued)

*Primary Examiner* — Hai Vo
(74) *Attorney, Agent, or Firm* — Birch, Stewart, Kolasch & Birch, LLP

(57) ABSTRACT

Provided are the following: a sandwich structure formed from a core component comprising a discontinuous reinforcing fiber, a thermoplastic resin and voids, and a skin component comprising a continuous reinforcing fiber and a matrix resin, wherein in the core component, 30% or more of the discontinuous reinforcing fiber is covered with the thermoplastic resin and monofilaments of the discontinuous reinforcing fiber intersect one another via the thermoplastic (Continued)

resin; an integrally formed article using the sandwich structure; and methods for the production therefor.

11 Claims, 3 Drawing Sheets

(51) Int. Cl.
| | |
|---|---|
| *B32B 5/26* | (2006.01) |
| *B32B 3/26* | (2006.01) |
| *B29C 45/16* | (2006.01) |
| *B29C 44/12* | (2006.01) |
| *B32B 5/20* | (2006.01) |
| *B32B 5/24* | (2006.01) |
| *B29K 105/12* | (2006.01) |
| *B29K 101/12* | (2006.01) |
| *B29K 105/04* | (2006.01) |
| *B29K 105/08* | (2006.01) |
| *B29K 307/04* | (2006.01) |
| *B29L 9/00* | (2006.01) |

(52) U.S. Cl.
CPC .............. *B32B 5/18* (2013.01); *B32B 5/20* (2013.01); *B32B 5/245* (2013.01); *B32B 5/26* (2013.01); *B29K 2101/12* (2013.01); *B29K 2105/04* (2013.01); *B29K 2105/08* (2013.01); *B29K 2105/12* (2013.01); *B29K 2307/04* (2013.01); *B29L 2009/00* (2013.01); *B32B 2250/40* (2013.01); *B32B 2260/021* (2013.01); *B32B 2260/023* (2013.01); *B32B 2260/046* (2013.01); *B32B 2262/00* (2013.01); *B32B 2262/106* (2013.01); *B32B 2266/02* (2013.01); *B32B 2266/025* (2013.01); *B32B 2266/0214* (2013.01); *B32B 2266/0228* (2013.01); *B32B 2266/0235* (2013.01); *B32B 2266/0242* (2013.01); *B32B 2266/0257* (2013.01); *B32B 2266/0264* (2013.01); *B32B 2266/0278* (2013.01); *B32B 2266/0292* (2013.01); *B32B 2307/544* (2013.01); *B32B 2307/546* (2013.01)

(56) References Cited

U.S. PATENT DOCUMENTS

| | | |
|---|---|---|
| 2009/0117366 A1 | 5/2009 | Honma |
| 2014/0030491 A1 | 1/2014 | Sakai et al. |
| 2016/0303824 A1* | 10/2016 | Takebe .................. B32B 5/26 |

FOREIGN PATENT DOCUMENTS

| | | |
|---|---|---|
| JP | 4-334439 A | 11/1992 |
| JP | 8-224793 A | 9/1996 |
| JP | 2005-313613 A | 11/2005 |
| JP | 2010-253937 A | 11/2010 |
| JP | 2012-000890 A | 1/2012 |
| JP | 2012-152982 A | 8/2012 |
| WO | WO 2006/028107 A1 | 3/2006 |

OTHER PUBLICATIONS

First Office Action dated Dec. 2, 2016, in Chinese Patent Application No. 201480047371.3, with English translation.
International Search Report (PCT/ISA/210) issued in PCT/JP2014/068999, dated Oct. 7, 2014.
Written Opinion (PCT/ISA/237) issued in PCT/JP2014/068999, dated Oct. 7, 2014.
English translation of Written Opinion of the International Searching Authority dated Jan. 4, 2016, in PCT International Application No. PCT/JP2014/068999.

* cited by examiner (a)

(b)

SANDWICH STRUCTURE AND INTEGRALLY FORMED ARTICLE USING THE SAME, AND METHODS FOR PRODUCTION THEREOF

TECHNICAL FIELD

The present invention relates to a sandwich structure excellent in lightweight, thinness and stiffness, and more particularly, it relates to a sandwich structure with properties excellent especially in lightweight and stiffness using a specific core component and a fiber reinforcement for a skin member.

BACKGROUND ART

Fiber reinforced plastics (FRP) reinforced by a group of continuous reinforcing fibers are often used as materials of structures requiring lightweight and mechanical properties for such applications as transport apparatuses including aircraft, automobiles, two wheelers and bicycles, sports goods including tennis rackets, golf club shafts and fishing rods, architectural structures including earthquake-resisting reinforcing materials, etc.

As a lighter weight structure having sufficient mechanical properties, a sandwich structure in which one each FRP component is disposed on the skin members of a lightweight core component is known. For reducing the weight of a structure, a core component lighter in weight is selectively used, and a balsa core, honeycomb core, urethane foam core, etc. are frequently used as core components. Further, such sandwich structures are designed to satisfy practically required mechanical properties and are widely used as secondary structural materials of aircraft and also as automobile members, architectural members, panel members, etc.

Patent Document 1 discloses a foamed core component in which resin is foamed and a core component in which monofilaments of discontinuous reinforcing fiber intersect one another via thermoplastic resin as a core component of a sandwich structure. Patent Document 2 discloses a lightweight composite material having a layered structure composed of a fiber-reinforced resin layer of a fiber for reinforcement and a porous fiber layer produced by binding short fibers for reinforcement dispersed in random directions, with a binder at their intersections.

However, in case of these sandwich structures or composite materials, it is difficult to satisfy both stiffness and lightweight, and there is a limit for mass-producing a thin-walled complicatedly shaped article. Since the core component of the sandwich structure disclosed in Patent Document 1 is produced using particles of a thermoplastic resin and a discontinuous reinforcing fiber, it was difficult to well balance the stiffness and the lightweight of the core component even though monofilaments of the discontinuous reinforcing fiber intersect one another via the thermoplastic resin. The lightweight composite material disclosed in Patent Document 2 is poor in moldability of the core component because of the use of carbide obtained by calcining a thermosetting resin or the like as the resin for forming a core component.

On the other hand, the applications of FRP include housings of electric and electronic apparatuses such as personal computers, office automation apparatuses, audio-visual apparatuses, cell phones, telephone sets, facsimiles, household electric appliances and toys. These applications require mass productivity, moldability, productivity and economic efficiency, and in recent years, additionally, thinness and lightweight. To meet these requirements, magnesium alloys excellent in thinness and stiffness may be used, but since metallic materials have large specific gravities, they are not quite satisfactory in view of lightweight. It is anticipated that electronic apparatuses such as notebook-type personal computers, telephone sets and information terminals will be increasingly made portable and that aged users will further increase in future. Therefore, it is highly demanded that these electronic apparatus housings are further reduced in weight.

PRIOR ART DOCUMENTS

Patent Documents

Patent Document 1: WO 2006/028107
Patent Document 2: JP-A-63-60743

SUMMARY OF THE INVENTION

Problems to be Solved by the Invention

In view of such conventional technologies, an object of the invention is to provide a sandwich structure excellent in lightweight and stiffness. Another object of the invention is to provide an integrally formed article excellent in lightweight and stiffness in which that sandwich structure and another member are integrated. Still another object of the invention is to provide a method for producing of the sandwich structure or integrally formed article by which the sandwich structure or the integrally formed article can be produced in good mass-productivity.

Solutions to the Problems

In order to solve the above-described problems, the sandwich structure of the invention has the following configuration:

A sandwich structure formed from a core component comprising a discontinuous reinforcing fiber, a thermoplastic resin and voids, and a skin member comprising a continuous reinforcing fiber and a matrix resin, wherein in the core component, 30% or more of the discontinuous reinforcing fiber is covered with the thermoplastic resin, and monofilaments of the discontinuous reinforcing fiber intersect one another via the thermoplastic resin.

In order to solve the above-described problems, the method for producing a sandwich structure of the invention has the following configurations:

A method for producing the sandwich structure set forth above comprising the following steps [1] to [3]:

step [1]: a step of forming a precursor of a core component by impregnating the reinforcing fiber to be used for the core component with a thermoplastic resin by applying pressure in a state where the thermoplastic resin is heated at a temperature at which the thermoplastic resin melts or softens, step [2]: a step of forming a skin member from a continuous reinforcing fiber and a matrix resin, step [3]: a step of forming the core component by expanding the precursor of the core component by adjusting the thickness thereof so that the precursor of the core component may have a prescribed expansion ratio in a heated state.

In order to solve the above-described problems, the integrally formed article of the invention has the following configuration:

An integrally formed article obtained by joining a first member made of the sandwich structure set forth above and a second member made of another formed article.

Moreover, in order to solve the above-described problems, the method for producing an integrally formed article of the invention has any of the following configurations:

A method for producing the integrally formed article set forth above, wherein the second member is a formed article produced by injection molding and the second member is joined to the first member by insert injection molding or outsert injection molding.

A method for producing the integrally formed article set forth above, wherein the second member is a formed article produced by press molding and the second member is joined to the first member by press molding.

In the invention, the term "continuous reinforcing fiber" means a continuous reinforcing fiber over a length of 15 mm or more, preferably 100 mm or more, in at least one direction.

Effects of the Invention

The sandwich structure of the invention is excellent in mechanical properties, lightweight, and thinness on the basis of the characteristic design of its core component. The method for producing the sandwich structure of the invention has excellent mass productivity, and the production can be performed very economically compared with the conventional production. The sandwich structure and the integrally formed article of the invention can be suitably used as a part, member or housing of an electric or electronic apparatus such as a notebook-type personal computer.

EMBODIMENTS OF THE INVENTION

Figure 1:
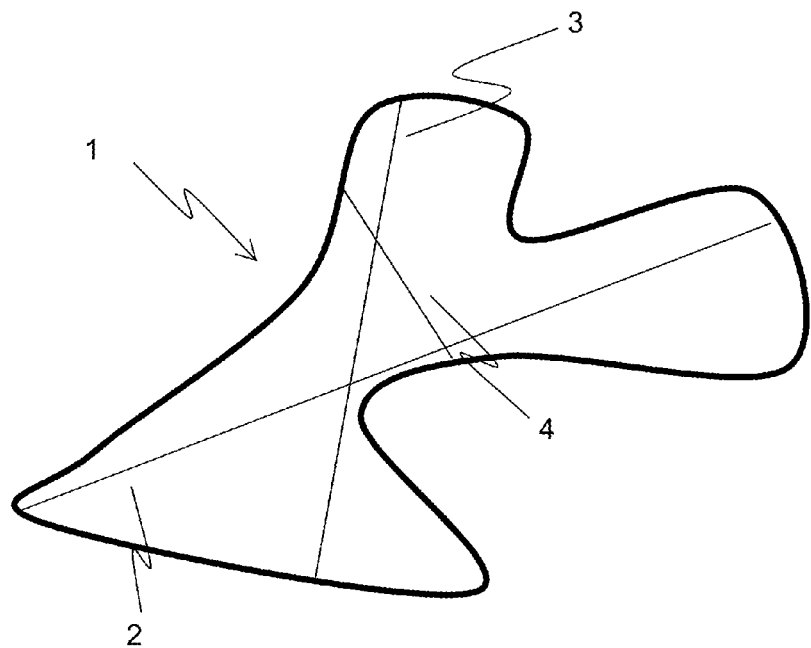
FIG. 1 shows a schematic diagram of a cluster in a core component to be used in the invention.

The present inventors have pursued the stiffness and lightweight of a sandwich structure composed of a core component comprising a discontinuous reinforcing fiber, a thermoplastic resin, and voids and a fiber-reinforced material composed of a continuous reinforcing fiber and a matrix resin and, as a result, found that the properties were influenced by a specific structure of a core component to be used for a sandwich structure, and thus reached the invention. The invention is described in detail below.

The sandwich structure is a structural body comprising a core component and skin members, wherein the core component is sandwiched by the skin members. In the invention, the core component includes a discontinuous reinforcing fiber, a thermoplastic resin, and voids and the skin members each comprise a continuous reinforcing fiber and a matrix resin.

In the invention, the reinforcing fiber to be used for the core component is discontinuous and the reinforcing fiber usable therefor has no particular limitations with respect to the type thereof, and examples thereof include metal fibers, such as an aluminum fiber, a brass fiber, and a stainless steel fiber, carbon fibers (including graphite fibers), such as polyacrylonitrile (PAN)-based carbon fibers, rayon-based carbon fibers, lignin-based carbon fibers, and pitch-based carbon fibers, insulating fibers, such as glass fiber, organic fibers, such as aramid fibers, polyparaphenylene benzoxazole (PBO) fibers, polyphenylene sulfide fibers, polyester fibers, acrylic fibers, nylon fibers, and polyethylene fibers, and inorganic fibers, such as silicon carbide fibers and silicon nitride fibers. Fibers prepared by applying surface treatment to these fibers are also available. Examples of the surface treatment include treatment with a coupling agent, treatment with a sizing agent, treatment with a binder, and adhesion treatment with an additive in addition to deposition treatment with conductive metal. Regarding these reinforcing fibers, one species thereof may be used singly or two or more thereof may be used in combination. Especially, carbon fibers excellent in specific strength and specific stiffness, such as PAN-based carbon fibers, pitch-based carbon fibers, and rayon-based carbon fibers, are preferably used from the viewpoint of a weight reduction effect. Glass fiber is preferably used in view of improving the economy of a resulting formed article, and use of carbon fiber in combination with glass fiber is particularly preferred in view of the balance between mechanical properties and economy. In view of improving the shock absorbency and shape-imparting property of the resulting formed article, use of aramid fiber is preferable, and in particular, use of carbon fiber in combination with aramid fiber is preferred in view of the balance between the mechanical properties and shock absorbency. In addition, a reinforcing fiber covered with metal such as nickel, copper, or ytterbium is also usable in view of improving the electroconductivity of a resulting formed article. Of these, discontinuous carbon fiber is more preferably used as the discontinuous reinforcing fiber in the core component in the invention, and as the carbon fiber, PAN-based carbon fiber, which is excellent in strength and mechanical properties such as modulus, is particularly preferably used.

The discontinuous reinforcing fiber as used herein is a reinforcing fiber being less than 15 mm in fiber length, and many discontinuous reinforcing fibers are contained in the core component and constitute a group of discontinuous reinforcing fibers. Such a group of discontinuous reinforcing fibers is preferably composed of from 0% by mass to 50% by mass of reinforcing fibers being more than 10 mm but less than 15 mm in length, from 50% by mass to 100% by mass of reinforcing fibers being from 2 mm to 10 mm in length, and from 0% by mass to 50% by mass of reinforcing fibers being less than 2 mm in length; if the content of reinforcing fibers being longer than 10 mm but shorter than 15 mm exceeds 50% by mass, the thickness expansion in the lamination step or the molding step becomes larger and the handling convenience may be impaired. If the content of reinforcing fibers being less than 2 mm in fiber length exceeds 50% by mass, the mechanical properties of a resulting reinforcing fiber core material may lower. From these viewpoints, such a group of discontinuous reinforcing fibers is more preferably composed of from 0% by mass to 20% by mass of reinforcing fibers being more than 8 mm but less than 15 mm in length, from 80% by mass to 100% by mass of reinforcing fibers being from 3 mm to 8 mm in length, and from 0% by mass to 20% by mass of reinforcing fibers being less than 3 mm in length. It is also preferred that the distribution of fiber length in the group of discontinuous reinforcing fibers has at least two peaks, one of which is within a fiber length range of from 5 mm to 10 mm and the other is within a range of 2 mm or more but less than 5 mm. Forming a group of discontinuous reinforcing fibers having such distribution of fiber length allows a reinforcing fiber to secure mechanical properties and a reinforcing fiber to secure the handling convenience of a core component during a lamination step or a molding step to be used in combination and thus can easily establish the characteristics of both the reinforcing fibers. The mass proportion of a reinforcing fiber used herein means the proportion of the number average in number of fibers at each fiber length when the number of all fibers in the group of discontinuous reinforcing fibers is taken as 100%.

Methods for measuring the fiber length of reinforcing fiber include, for example, a method comprising isolating the reinforcing fiber directly from a group of reinforcing fibers and measuring the fiber length by microscopic observation. When resin has adhered to a group of reinforcing fibers, a method in which the resin contained in the group of reinforcing fibers is dissolved using a solvent which dissolves only the resin and the remaining reinforcing fibers are collected by filtration and measured by microscopic observation (dissolution method) can be employed; when no solvent capable of dissolving the resin is available, there is, for example, a method in which only the resin is burned off at a temperature within a range where the reinforcing fibers are not reduced in weight by oxidation and the reinforcing fibers are thereby isolated and measured by microscopic observation (burn-off method) can be employed. The measurement can be done by randomly selecting 400 reinforcing fibers from the group of reinforcing fibers, measuring their lengths down to the order of micrometers with an optical microscope, and then determining the fiber lengths and the ratio thereof. When comparing the method comprising isolating a reinforcing fiber directly from a group of reinforcing fibers and the method comprising isolating a reinforcing fiber by the dissolution method or the burn-off method, there is no particular difference in obtained results as long as conditions are appropriately selected. Of these measurement methods, it is preferred to employ the dissolution method because this induces less change in mass of the reinforcing fiber.

As the discontinuous reinforcing fiber, one having a tensile modulus preferably within a range of 200 GPa to 1000 GPa, more preferably 220 GPa to 500 GPa, can be used from the viewpoint of the stiffness of the sandwich structure. When the tensile modulus of the reinforcing fiber is smaller than 200 GPa, the stiffness of the sandwich structure may be poor, and when the tensile modulus is larger than 1000 GPa, it is necessary to enhance the crystallinity of the reinforcing fiber, and it becomes difficult to produce such a reinforcing fiber. It is preferred that the tensile modulus of the discontinuous reinforcing fiber is within the above-mentioned range from the viewpoint of the stiffness of the sandwich structure and the productivity of the reinforcing fiber. The tensile modulus of the reinforcing fiber can be measured by the strand tensile test disclosed in JIS R7601-1986.

In the invention, the volume content of the discontinuous reinforcing fiber to be used for the core component is preferably 1% to 30% relative to the apparent volume of the core component, and it is more preferably 3% to 10% from the viewpoint of well-balancing lightweight and mechanical properties. When the volume content of the discontinuous reinforcing fiber is less than 1%, stiffness is insufficient, and when the volume content exceeds 30%, the volumetric specific gravity of the core component becomes excessively large. The apparent volume of the core component includes the volume of the discontinuous reinforcing fiber, the volume of the thermoplastic resin, and the volume of the voids. The apparent volume of the core component, the volume of the discontinuous reinforcing fiber constituting the core component, the volume of the thermoplastic resin, and the volume of voids can be measured with an X-ray inspection apparatus (computed tomography) (X-ray CT).

It is important for the discontinuous reinforcing fiber to be used for the core component in the invention that 30% or more of the surface thereof is covered with the thermoplastic resin. That is, the discontinuous reinforcing fiber is covered with the thermoplastic resin such that the coverage may be 30% or more relative to the entire surface area of the discontinuous reinforcing fiber. The coverage is preferably 50% or more, more preferably 80% or more. By achieving such a coverage, a fiber-reinforced thermoplastic resin is formed as a core component of a sandwich structure and the stiffness can be enhanced, and flexibility in expansion ratio can be secured when expansion is performed by heating during the formation of the core component as described later. The coverage is measured by distinguishing the reinforcing fiber from the resin by observing a cross section of the reinforcing fiber by a scanning electron microscope (SEM). Moreover, in the state of covering the discontinuous reinforcing fiber with the thermoplastic resin in a preferred embodiment, the surface of the reinforcing fiber is not exposed due to the covering with the thermoplastic resin, in other words, the reinforcing fiber is covered with the thermoplastic resin like an electric wire. This can form a uniform structure as a core component, reducing the scattering in dimension.

In the invention, it is important for a core component that the monofilaments of the discontinuous reinforcing fiber intersect one another via the thermoplastic resin. As a result of this, the monofilaments of the discontinuous reinforcing fiber are jointed by the thermoplastic resin, and thus the shear modulus of the core component is increased and, as a result, the stiffness as a sandwich structure is increased. The proportion of the number of intersecting portions at which monofilaments of the discontinuous reinforcing fiber intersect one another via the thermoplastic resin is 50% or more, preferably 70% or more, more preferably 90% or more relative to the number of all intersecting portions at which monofilaments of the discontinuous reinforcing fiber intersect one another, and this contributes efficiently to the shear modulus of the core component and makes higher the stiffness of a sandwich structure.

In the invention, the thermoplastic resin to be used for the core component may be either crystalline or amorphous. Examples of the crystalline thermoplastic resin include polyester, polyolefin, polyoxymethylene (POM), polyamide (PA), polyarylene sulfide, polyketone (PK), polyether ketone (PEK), polyether ether ketone (PEEK), polyether ketone ketone (PEKK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAI), polyether imide (PEI), polysulfone (PSU), polyether sulfone, and polyarylate (PAR). The thermoplastic resin to be used for the core component also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof. Of these, polyolefin, polyamide, polyester, polycarbonate, polystyrene, modified polyphenylene ether, and polyarylene sulfide are used preferably as the thermoplastic resin to be used for the core component. The preferred is a polyolefin in view of the lightweight of resulting formed article, a polyamide in view of the strength, a polyester in view of hygroscopicity, an amorphous resin such as a polycarbonate, a polystyrene, or a modified polyphenylene ether in view of surface appearance, a polyarylene sulfide in view of heat resistance, and a polyether ether ketone in view of continuous use temperature.

As described above, while polyolefin is preferably used from the viewpoint of the lightweight of a resulting formed article, the polyolefin is divided roughly into unmodified polyolefin and modified polyolefin. Particularly in the invention, it is preferred to use a mixture of a non-modified polyolefin and a modified polyolefin as the thermoplastic resin to be used for the core component.

The non-modified polyolefin means a polyolefin that has not been modified with functional groups, namely, a polyolefin substantially not containing functional groups such as those described below, and the modified polyolefin means a polyolefin that has been modified with a functional group, namely, a polyolefin containing a functional group such as those described below.

Preferred examples of the functional group by modification in a modified polyolefin include a carboxyl group, an acid anhydride, a hydroxy group, an epoxy group, and an amino group. Meanwhile, the number of functional groups can be confirmed using an acid value, OH value, epoxy value, amine value or the like as an indicator. Among modified polyolefins, an acid-modified polyolefin is especially preferred in view of handling convenience and modification easiness.

It is preferred in view of higher adhesion that the number of functional groups of the modified polyolefin due to modification is larger. The method for modifying the polyolefin is not especially limited, and examples thereof include a graft reaction of a functional group-containing compound, addition reaction to ends, and copolymerization of a functional group-containing block. Above all, for increasing functional groups, a modification technique by a graft reaction of a functional group-containing compound having a double bond to an unsaturated polyolefin is more preferred.

When a mixture of a non-modified polyolefin and a modified polyolefin is used as the polyolefin, the mixed amount of the modified polyolefin is preferably 5% by mass or more, more preferably 10% by mass to 50% by mass, relative to the whole mass of the polyolefin from the viewpoint of handling convenience. When an acid-modified polyolefin is used as the modified polyolefin, the acid value of the acid-modified polyolefin is preferably 10 or more, more preferably 20 or more, and even more preferably 30 or more. The acid value of the acid-modified polyolefin is preferably 60 or less because the viscosity of the resin is high and the handling convenience may be impaired if the acid value is excessively large.

To any one of the thermoplastic resins enumerated in the above groups may be added an impact resistance improving agent, filler and other additives used as ingredients of elastomers and rubbers to such an extent that the object of the invention is not impaired. Examples of them include an inorganic filler, flame retarder, conductivity additive, crystal nucleating agent, ultraviolet light absorber, antioxidant, damping material, antimicrobial agent, insecticide, deodorant, coloration preventive, thermal stabilizer, releasing agent, antistatic agent, plasticizer, slip agent, colorant, pigment, dye, foaming agent, foam stabilizer and coupling agent.

In particular, in the invention, it is preferred to add an antioxidant to the thermoplastic resin to be used for the core component.

Examples of antioxidant include phenol-based antioxidants, sulfur-containing antioxidants, phosphorus-containing antioxidants, hindered amine-based antioxidants, and hindered phenol-based antioxidants. Of these, phosphorus-containing antioxidants and hindered phenol-based antioxidants are preferably used because they exert excellent oxidation prevention effect in a resin in which an inorganic filler, a pigment, or the like has been mixed.

By adding an antioxidant to the thermoplastic resin to be used for the core component, the moldability is improved because the heat decomposition of the thermoplastic resin is inhibited during molding of the thermoplastic resin.

The added amount of the antioxidant to the thermoplastic resin to be used for the core component is preferably 0.1% by mass to 5% by mass, more preferably within a range of 0.1% by mass to 3% by mass, even more preferably within a range of 0.1% by mass to 1% by mass from the viewpoint of well-balancing inhibition of heat decomposition of the thermoplastic resin and the moldability.

In the invention, the volume content of the thermoplastic resin to be used for the core component is preferably 10% to 80% relative to the apparent volume of the core component, and it is more preferably 10% to 40% from the viewpoint of well-balancing lightweight and mechanical properties. When the volume content of the thermoplastic resin is less than 10%, stiffness is prone to be insufficient, and when the volume content exceeds 80%, the volumetric specific gravity of the core component may become excessively large.

In the invention, the volume content of the voids in the core component is preferably 10% to 85% relative to the apparent volume of the core component, and it is more preferably 20% to 85%, and even more preferably 50% to 80% from the viewpoint of well-balancing lightweight and mechanical properties.

In the invention, in the core component, the discontinuous reinforcing fiber and the thermoplastic resin constituting the core component usually form clusters. It is preferred from the viewpoint of the stiffness of the sandwich structure and the core component that the average of the maximum lengths of the clusters is 100 µm or more, preferably 200 µm or more, more preferably 300 µm or more when observing a cross section of the core component because this allows the discontinuous reinforcing fiber and the thermoplastic resin to bond firmly and can make higher the shear modulus of the core component. When the average of the maximum lengths of clusters is excessively large, the volume content of voids in the core component is small and thus the lightweight as the core component is expected to be affected, and therefore the average of the maximum lengths of clusters is preferably 800 µm or less. A cluster means an aggregate of a discontinuous reinforcing fiber and a thermoplastic resin which is recognized when a core component portion is observed at a magnification of ×200 with a laser microscope in a thickness direction section of a sandwich structure or a core component, and specifically means amass formed from the discontinuous reinforcing fiber and the thermoplastic resin. In the observed field of a section, clusters usually assemble without being in contact with each other. The maximum length of a cluster is the largest length of straight lines drawn in the cluster on an image taken by observing a core component portion with a laser microscope in a thickness direction section of a sandwich structure or a core component. The cluster is illustrated in an embodiment shown in FIG. 1, and the maximum length of the cluster in this case is the longest straight line 2 of straight lines 2, 3, and 4. Three observed images of a core component portion taken at different sites are prepared and 10 clusters are selected arbitrarily in each observed image. Straight lines are drawn on the individual clusters and the maximum length is measured individually. The average of the maximum lengths of the clusters is determined by averaging the measured maximum lengths of the ten clusters.

In the invention, usually, 30% or more of the surface of the discontinuous reinforcing fiber is covered with the thermoplastic resin, and monofilaments of discontinuous reinforcing fiber intersect one another via the thermoplastic resin and form a cluster. 30% or more of the entire surface area of the discontinuous reinforcing fiber in a cluster has been covered with the thermoplastic resin and thus a fiber-reinforced thermoplastic resin has been formed, and thus the stiffness as a core component is increased and the stiffness of a sandwich structure using the core component becomes remarkably high.

In the invention, the flexural modulus of the core component is preferably 2.5 GPa to 20 GPa, more preferably 3.0 GPa to 15 GPa from the viewpoint of the stiffness of a sandwich structure. If the flexural modulus of the core component is smaller than 2.5 GPa, the stiffness of the sandwich structure may be insufficient, and if the flexural modulus is larger than 20 GPa, the lightweight of a sandwich structure may be insufficient. The flexural modulus of the core component is determined in accordance with ASTM D790 by performing a three-point bending test with a support span being adjusted to 16 times the specimen thickness. The result evaluated by the average of five samples is used as a flexural modulus.

In the invention, the volumetric specific gravity of a core component is preferably 0.01 to 0.6, more preferably 0.1 to 0.6 from the viewpoint of lightweight. If the volumetric specific gravity of the core component is smaller than 0.01, the stiffness of the sandwich structure may be insufficient due to increase in voids in the core component, and if the volumetric specific gravity is larger than 0.6, the lightweight of a sandwich structure may not be achieved. The volumetric specific gravity of a core component is determined by taking a sample by cutting only the core component from a sandwich structure into a size of 100 mm in width, 100 mm in length (and the thickness of the core component in thickness), and then calculating the volumetric specific gravity from the mass W (g) and the apparent volume V (cm$^3$) of the sample according to the formula given below.

Volumetric specific gravity=$W/V$

In the invention, the same type of reinforcing fiber as the discontinuous reinforcing fiber to be used for the core component described previously, for example, can be used as the continuous reinforcing fiber to be used for the skin member. Especially, the continuous reinforcing fibers in the skin member are particularly preferably continuous carbon fibers.

The tensile modulus of usable continuous reinforcing fibers is preferably within a range of from 360 GPa to 1000 GPa, more preferably from 500 GPa to 800 GPa from the viewpoint of the stiffness of a sandwich structure. When the tensile modulus of reinforcing fibers is smaller than 360 GPa, the stiffness of a sandwich structure may be poor, and when the tensile modulus is larger than 1000 GPa, it is necessary to improve the crystallinity of the reinforcing fibers and it becomes difficult to produce such reinforcing fibers. It is preferred that the tensile modulus of reinforcing fibers is within the aforementioned range from the viewpoint of further improvement in the stiffness of a sandwich structure and improvement in the productivity of the reinforcing fibers. The tensile modulus of reinforcing fibers can be measured by the strand tensile test disclosed in JIS R7601-1986.

In the invention, examples of a matrix resin preferably used for the skin member include thermosetting resins, such as unsaturated polyester resin, vinyl ester resin, epoxy resin, phenol (resol type) resin, urea resin, melamine resin, polyimide resin, maleimide resin, and benzoxazine resin. A resin prepared by blending two or more of them may also be employed. Of these, epoxy resin is especially preferred from the viewpoint of the mechanical properties and the heat resistance of a formed article. In order to develop excellent mechanical properties of such epoxy resin, the epoxy resin is preferably contained as a main component of the resin to be used, and specifically, it is preferably contained in an amount of 60% by mass or more relative to the whole mass of the resin composition.

An epoxy resin the precursors of which are an amine, a phenol, and a compound having a carbon-carbon double bond is preferably used as epoxy resin.

As a curing agent for an epoxy resin, any compound having an active group capable of reacting to an epoxy group can be used. As the curing agent, a compound having an amino group, a carboxylic acid anhydride group, or an azide group is suitable. Examples of the curing agent more specifically include dicyandiamide, diaminodiphenylmethane (including various isomers), diaminodiphenylsulfone (including various isomers), aminobenzoic acid esters, various acid anhydrides, phenol novolac resins, cresol novolac resins, polyphenol compounds, imidazole derivatives, aliphatic amines, tetramethyl guanidine, thiourea-added amines, carboxylic acid anhydrides (e.g., methyl hexahydrophthalic anhydride), carboxylic acid hydrazides, carboxylic acid amides, polymercaptans, and Lewis acid complexes (e.g., boron trifluoride ethylamine complex). Such curing agents may be used individually or two or more of them may be used in combination.

By use of an aromatic diamine as a curing agent, a cured resin being good in heat resistance is obtained. Especially, isomers of diaminodiphenylsulfone are most suitable for obtaining a cured resin being good in heat resistance. In the case of using an aromatic diamine as a curing agent, it is preferred to add the diamine such that its added amount may be stoichiometrically equivalent, but, according to circumstances, a cured resin having a higher modulus of elasticity is obtained, for example, by approximately from 0.7 to 0.8 equivalent use.

Moreover, by use of a combination of dicyandiamide and a urea compound (e.g., 3,4-dichlorophenyl-1,1-dimethylurea) or an imidazole compound as a curing agent, high heat and water resistance is obtained while curing at relatively low temperatures. Curing with an acid anhydride affords a cured resin being lower in water absorption rate as compared to a case where an amine compound is used as a curing agent. In addition, a latent form of such a curing agent, such as a microcapsulated form, can be used.

Of curing agents for an epoxy resin, a combination of dicyandiamide and a urea compound is preferably used because it readily enables curing within 10 minutes at a temperature of 145° C. or higher.

Such an epoxy resin and a curing agent, or a material obtained by preliminarily reacting part of them may be incorporated in a composition. This method may be effective in viscosity regulation or improvement in storage stability.

It is also preferred to add a thermoplastic resin to the aforementioned epoxy resin composition with the thermoplastic resin being dissolved. Generally, such a thermoplastic resin is preferably a thermoplastic resin having, in its main chain, a bond or linkage selected from among a carbon-carbon bond, an amide linkage, an imide linkage, an ester linkage, an ether linkage, a carbonate linkage, a urethane linkage, a thioether linkage, a sulfone linkage, or carbonyl linkage, and it may partially have a crosslinked structure. Moreover, it may have crystallinity or may be amorphous. In particular, it is preferred that at least one resin selected from the group consisting of polyamide, polycarbonate, polyacetal, polyphenylene oxide, polyphenylene sulfide, polyarylate, polyester, polyamide imide, polyimide (e.g., polyimide having a phenyltrimethylindane structure), polyether imide, polysulfone, polyethersulfone, polyether ketone, polyether ether ketone, polyaramid, polyether nitrile, and polybenzimidazole has been dissolved in the epoxy resin composition.

A thermoplastic resin is also suitably used as the matrix resin to be used for the skin member, and examples thereof include the same species as thermoplastic resins to be used for the core component described above.

Next, the sandwich structure of the invention is described in more detail.

In the sandwich structure of the invention, it is preferred that part of the thermoplastic resin to be used for the core component has been permeated into the skin member and the maximum permeation distance of the permeated part is 10 μm or more from the core component from the viewpoint of the joining strength between the core component and the skin member, and the maximum permeation distance is more preferably 15 μm or more. The method for measuring the maximum permeation distance is not particularly limited, and the permeation distance of the thermoplastic resin to be used for the core component having been permeated into the skin member can be measured, for example, by observing the interface between the skin member and the core component by cross section observation of the sandwich structure.

In the sandwich structure of the invention, the precursor of the core component usually has heat expandability as described below. The heat expandability means that a group of reinforcing fibers in the precursor of the core component held in a compressed state by pressure application are expanded due to standing force derived from the modulus of elasticity of the reinforcing fibers by heating the precursor to a temperature equal to or higher than the melting point of the thermoplastic resin constituting the precursor. This allows a voids-containing structure to be formed and enables free control of the thickness of the core component within a range allowed by the characteristics of the reinforcing fibers and the thermoplastic resin.

The precursor of the core component as referred to herein means the material of the core component composed of discontinuous reinforcing fibers and a thermoplastic resin and containing substantially no voids. If the volume content of voids is equal to or less than 5% relative to the apparent volume of the precursor of the core component, it is usually considered that substantially no voids are contained.

Figure 2:
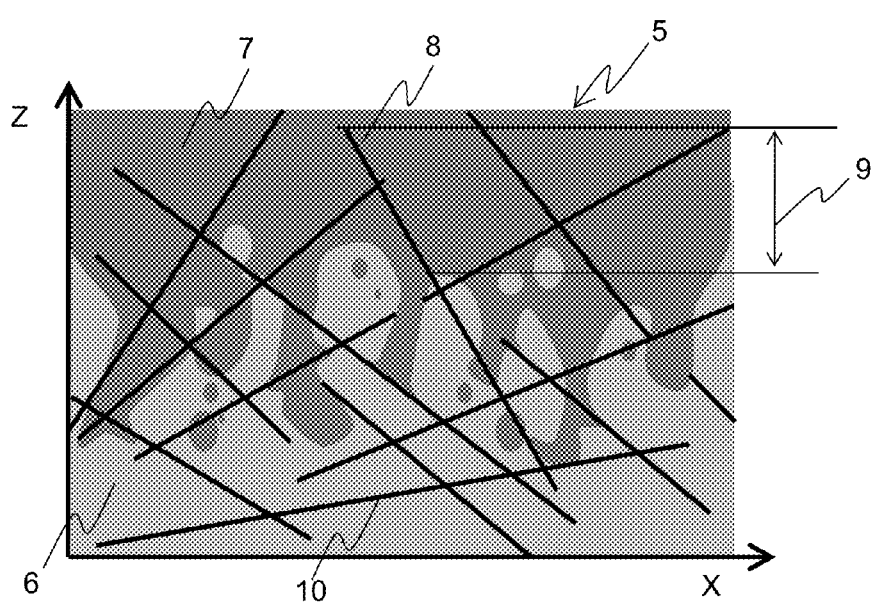
FIG. 2 shows a schematic diagram illustrating an example of the interface layer between the core component and the skin member in the sandwich structure of the invention.

It is preferred with the sandwich structure of the invention that part of the discontinuous reinforcing fibers in the core component penetrates the skin member. The state where the discontinuous reinforcing fibers penetrate the skin member is illustrated as an example in the embodiment depicted in FIG. 2. That is, discontinuous reinforcing fibers 8 are present with a matrix resin 7 and a thermoplastic resin 6 being enclosed in the interface layer formed by the matrix resin constituting the skin member and the thermoplastic resin constituting the core component as depicted in FIG. 2, in other words, the matrix resin and the thermoplastic resin are held in a strong joined state due to anchoring by the discontinuous reinforcing fibers. The degree of penetration of the discontinuous reinforcing fiber (the degree of penetration of monofilaments 8 in FIG. 2) is not limited as long as the effect of the invention is not impaired, and from the viewpoint that the core component containing discontinuous reinforcing fibers functions as a joining medium and affects the ability to join the skin member and the core component, there preferably is a penetration state where the maximum penetration distance of the discontinuous reinforcing fibers of the core component into the skin member is preferably 5 μm or more, more preferably 10 μm or more. The penetration distance of the discontinuous reinforcing fiber of the core component into the skin member is represented by the shortest distance from the depth (horizontal plane) of the tip of the fiber on the matrix resin side of the skin member to the penetrating point at the interface between the matrix resin of the skin member and the thermoplastic resin of the core component, and in the case of a discontinuous reinforcing fiber 8 in FIG. 2, the penetration distance is represented by the distance indicated by numeral 9. Of the measured penetration distances, the largest value is taken as the maximum penetration distance. Specifically, the maximum penetration distance of the discontinuous reinforcing fiber of the core component into the skin member can be measured as follows. A joint portion between a skin member and a core component of a sandwich structure is cut out and a cross section thereof in the thickness direction is photographed at arbitrary ten points (ten images) at a magnification of ×1000 by using a laser microscope, and from the images taken, a penetration distance is determined for each monofilament of the discontinuous reinforcing fibers of the core component penetrating into the skin member and the maximum value thereof is defined as a maximum penetration distance.

In the sandwich structure of the invention, the discontinuous reinforcing fibers to be used for the core component are just required to be arranged such that the precursor of the core component may have heat expandability, but they are preferably arranged in a substantially monofilament state, more preferably in a monofilament state, and additionally, it is more preferred that the reinforcing fibers are distributed randomly. For example, a mat is excellent in shape-imparting property and therefore molding into a complicated shape is thereby facilitated. Since the voids formed by the mat are densified, the matrix resin and the thermoplastic resin form a more complicated interface and develop excellent joining ability. Moreover, since weak parts in ends of discontinuous reinforcing fiber bundles are minimized, isotropy is also imparted in addition to excellent joining ability, reinforcing efficiency, and reliability. The substantially monofilament state as referred to herein means that monofilaments are present in the form of a fine size strand having less than 500 filaments.

The dispersion state of discontinuous reinforcing fibers in a core component can be specified, for example, by observing reinforcing fibers in a thickness direction section of the core component with a scanning electron microscope (SEM).

Moreover, the term "dispersion in a monofilament state" means that the proportion of the monofilaments having the two-dimensional contact angle of 1° or more (henceforth referred to also as "degree of fiber dispersion") is 80% or more in the arbitrarily selected discontinuous reinforcing fibers in the core of the sandwich structure, and in other words, that the bundle of the monofilaments wherein 2 or more monofilaments are in contact and extend in parallel is less than 20% in the component. Accordingly, at least for the reinforcing fiber constituting the mat, the mass fraction of the fiber bundles containing up to 100 monofilaments corresponds to 100%.

Figure 3:
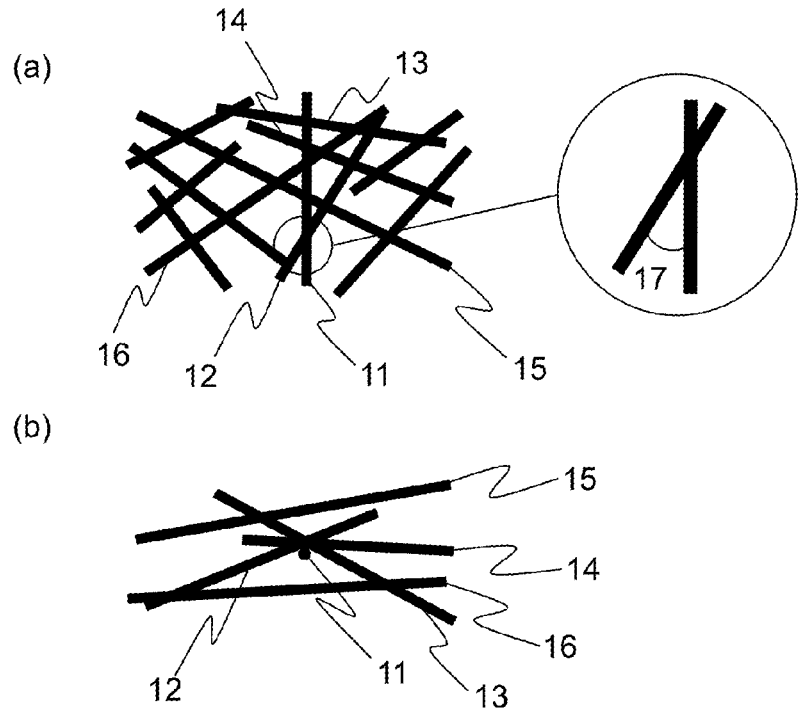
FIG. 3 shows a schematic diagram illustrating an example of the dispersion state of a discontinuous reinforcing fiber in a core component to be used in the invention.

The "two-dimensional contact angle" as used herein is an angle formed between a monofilament of the discontinuous reinforcing fiber and a monofilament in contact with that monofilament, and it is defined as an acute angle of from 0 degrees to 90 degrees of the angles formed by the two monofilaments in contact with each other. This two-dimensional contact angle is further described with reference to drawings. FIG. 3(a) and FIG. 3(b) illustrate one embodiment of the invention and are schematic diagrams of discontinuous reinforcing fibers in a sandwich structure observed from the plane direction (a) and the thickness direction (b), respectively. When a monofilament 11 is regarded as the reference, the monofilament 11 is observed to intersect with monofilaments 12 to 16 in FIG. 3(a), but the monofilament 11 is not in contact with monofilaments 15 and 16 in FIG. 3(b). In this case, objects to be used for the evaluation of two-dimensional contact angle with respect to the monofilament 11 as a reference are monofilaments 12 to 14, and of two angles formed by two monofilaments in contact with each other, the acute angle 17 of from 0 degrees to 90 degrees is a two-dimensional contact angle.

A method for measuring the two-dimensional contact angle is not particularly limited, and one exemplary method comprises grinding the surface of the sandwich structure to expose the discontinuous reinforcing fiber of the core component and observing the orientation of the discontinuous reinforcing fiber. Another exemplary method comprises taking an orientation image of the discontinuous reinforcing fiber by X-ray CT penetration observation. In the case of reinforcing fibers high in X-ray penetrability, addition of a tracer fiber to the reinforcing fiber or application of a tracer agent to the reinforcing fiber is preferable because this makes the observation of the reinforcing fiber easier. When it is difficult to perform the measurement by the methods described above, another exemplary method comprises placing a sandwich structure in a furnace or the like to burn a thermoplastic resin component at high temperature, and then observing the orientation of reinforcing fiber by an optical microscope or an electron microscope from a mat of the reinforcing fiber taken out. On the basis of the observation method described above, the degree of fiber dispersion is measured by the following procedure. A two-dimensional contact angle is measured for all monofilaments (monofilaments 12 to 14 in FIG. 3) being in contact with a randomly selected monofilament (monofilament 11 in FIG. 3). This procedure is performed for 100 monofilaments, and the proportion is calculated from the ratio of the number of the monofilament the two-dimensional contact angle of which was 1 degrees or more to the total number of all the monofilaments the two-dimensional contact angle of which was measured.

Moreover, it is particularly preferred that the discontinuous reinforcing fiber is dispersed randomly. That the discontinuous reinforcing fiber is dispersed randomly means herein that the average of the two-dimensional orientation angles of arbitrarily selected reinforcing fibers in the core component of the sandwich structure is 30 degrees to 60 degrees. The two-dimensional orientation angle is an angle formed between a monofilament of a discontinuous reinforcing fiber and a monofilament intersecting with that monofilament, and this angle is defined as the acute angle of 0 degrees to 90 degrees of the angles formed by the two monofilaments intersecting with each other. The two-dimensional orientation angle is further described with reference to drawings. When monofilament 11 is regarded as reference in FIGS. 3(a) and 3(b), the monofilament 11 intersects with other monofilaments 12 to 16. The term "intersect" means a state where the monofilament regarded as the reference is observed to intersect with other monofilament in the two-dimensional plane being observed, and the monofilament 11 and the monofilaments 12 to 16 are not required to be in contact with each other, and the case where the intersection is observed when projected is also included. In other words, all of the monofilaments 12 to 16 are subjected to evaluation of the two-dimensional orientation angle with regard to the monofilament 11, and the two-dimensional orientation angle is an acute angle 17 of 0 degrees to 90 degrees of the two angles defined by the two monofilaments intersecting in FIG. 3(a).

A method for measuring the two-dimensional orientation angle is not particularly limited, and an exemplary method comprises observation of the orientation of the discontinuous reinforcing fiber from the surface of the component, and the measurement can be conducted by a method similar to the measurement of the two-dimensional contact angle. Specifically, the average of two-dimensional orientation angles is measured by the following procedure. The average of the two-dimensional orientation angles between a randomly selected monofilament (monofilament 11 in FIG. 3) and all monofilaments intersecting with that monofilament (monofilaments 12 to 16 in FIG. 3) is measured. For example, when many monofilaments intersect with a certain monofilament, an average measured by randomly selecting 20 intersecting monofilaments may be used. This procedure is repeated five times in total for different monofilaments, and the average of the measurements is calculated for use as the average of two-dimensional orientation angles.

Random distribution of the discontinuous reinforcing fiber in a monofilament state contributes for maximizing the performance realized by the aforementioned discontinuous reinforcing fiber dispersed in a substantially monofilament state, and a particularly good adhesion is developed at the interface layer. In addition, isotropy can be imparted to mechanical properties of a sandwich structure and an integrally formed article prepared using the sandwich structure, and since internal stress in the interface layer caused by the anisotropy is reduced, excellent mechanical properties at the interface layer can be imparted. From such a viewpoint, the degree of fiber dispersion of the mat made of the reinforcing fiber is preferably 90% or more, and the degree of fiber dispersion closer to 100% is more preferred. The average of the two-dimensional orientation angle of the reinforcing fiber is preferably 40 degrees to 50 degrees, and an angle closer to the ideal angle of 45 degrees is more preferred.

The mat made of discontinuous reinforcing fiber (hereinafter sometimes briefly referred to as "discontinuous reinforcing fiber mat") to be used suitably for the precursor of the core component is produced, for example, by dispersing in advance the discontinuous reinforcing fiber into a strand state, preferably into a substantially monofilament state, more preferably into a monofilament state. Specific examples of methods known in the art for producing the discontinuous reinforcing fiber mat include dry processes such as the air-laid method in which the discontinuous reinforcing fiber is dispersed by air flow and then it is fabricated into sheet and the carding method in which a sheet is formed while mechanically combing the discontinuous reinforcing fiber, and wet processes such as the Radright method in which the discontinuous reinforcing fiber is stirred in water and is made into sheet. Exemplary means for bringing the discontinuous reinforcing fiber closer to a monofilament state include, in the case of a dry process, provision of an opening bar, vibration of the opening bar, use of a finer card, adjustment of the card rotation speed, and in the case of a wet process, adjustment of the conditions used in the stirring of the discontinuous reinforcing fiber, use of reinforcing fiber dispersion at lower concentration, adjustment of the viscosity of the dispersion, suppression of vortex during the transfer of the dispersion. More particularly, the discontinuous reinforcing fiber mat is preferably produced by a wet process, and the ratio of the reinforcing fiber in the discontinuous reinforcing fiber mat can be readily adjusted, for example, by increasing the concentration of the fiber to be fed or adjusting the flow speed (flow rate) of the dispersion and the mesh conveyer speed. For example, when the mesh conveyer speed is reduced in relation to the dispersion flow rate, the fiber in the resulting discontinuous reinforcing fiber mat is less likely to be oriented in the take up direction, and the production of a bulky discontinuous reinforcing fiber mat is thereby enabled. The discontinuous reinforcing fiber mat may be constituted solely from the discontinuous reinforcing fiber, or alternatively, the discontinuous reinforcing fiber may be mixed with a powdery or fibrous matrix resin component, or the discontinuous reinforcing fiber may be in the form of a mixture with an organic compound or an inorganic compound, or the discontinuous reinforcing fibers may be filled with a resin component.

The precursor of the core component can be produced by impregnating such a discontinuous reinforcing fiber mat with a film or a nonwoven fabric of thermoplastic resin. The pressure applied during the impregnation with the film or nonwoven fabric of thermoplastic resin is preferably 0.5 MPa to 30 MPa, more preferably 1 MPa to 5 MPa. If the pressure is lower than 0.5 MPa, the discontinuous reinforcing fiber mat may not be impregnated with the thermoplastic resin, and if the pressure is higher than 30 MPa, it is difficult to adjust the thickness of the precursor of the core component. The temperature applied during the impregnation with the film or nonwoven fabric of the thermoplastic resin is preferably a temperature equal to or higher than the melting point or the glass transition point of the thermoplastic resin, more preferably a temperature equal to or higher than a temperature calculated by adding 10° C. to the melting point or the glass transition point, and even more preferably a temperature equal to or higher than a temperature calculated by adding 20° C. to the melting point or the glass transition point. Temperatures equal to or lower than a temperature calculated by adding 150° C. to the melting point or the glass transition point of the thermoplastic resin are preferable because decomposition or degradation of the thermoplastic resin may occur when the temperature applied during the impregnation with the film or nonwoven fabric of the thermoplastic resin is excessively higher than the melting point or the glass transition point of the thermoplastic resin.

As a facility for realizing the method of impregnating the discontinuous reinforcing fiber mat with the film or nonwoven fabric of the thermoplastic resin, a compression molding machine or a double belt pressing machine can suitably be used. The compression molding machine is a batch type machine, and employment of an intermittent press system having two or more machines including one for heating and one for cooling enables improvement in productivity. The double belt pressing machine is a continuous type machine and it is superior in continuous productivity because continuous processing can be performed therewith easily.

The thickness of the sandwich structure of the invention is preferably 0.4 mm to 2 mm, more preferably 0.4 mm to 1 mm. Reducing the thickness of a sandwich structure also has an effect of lightening weight and a sandwich structure thinner than 0.4 mm may be poor in stiffness.

The sandwich structure of the invention can be produced preferably by a method comprising the following steps [1] to [3]:

step [1]: a step of forming a precursor of a core component by impregnating reinforcing fibers to be used for the core component with a thermoplastic resin by applying pressure in a state where the thermoplastic resin is heated at a temperature at which the thermoplastic resin melts or softens, step [2]: a step of forming a skin member from continuous reinforcing fibers and a matrix resin, step [3]: a step of forming the core component by expanding the precursor of the core component by adjusting the thickness thereof so that the precursor of the core component may have a prescribed expansion ratio in a heated state.

The step [1] is a step of preparing a precursor of a core component, in which the precursor of a core component is prepared by impregnating a discontinuous reinforcing fiber with a thermoplastic resin by adding a pressure of 0.5 MPa to 30 MPa to the thermoplastic resin and the reinforcing fiber in a state of being heated at a temperature at which the thermoplastic resin is melted or softened, that is, a temperature equal to or higher than the melting point or the softening point of the thermoplastic resin. Then, according to necessity, that product is cooled to a temperature lower than the melting point or the softening point of the thermoplastic resin and a pressure of 0.5 MPa to 30 MPa is added in a state where the thermoplastic resin is neither melted nor softened, and thus a precursor of a core component is prepared.

The step [2] is a step of preparing a skin member, in which, for example, the skin member is prepared by adding a pressure of 0.3 MPa to 30 MPa to a prepreg prepared by impregnating a continuous reinforcing fiber with a matrix resin.

The step [3] is a step of expanding the precursor of a core component and thereby forming a core component having voids, in which the thickness of the precursor of a core component is adjusted such that a prescribed expansion ratio will be attained in a heated state, and thereby the precursor is expanded to prepare a core component. At this time, the bonding force of the thermoplastic resin to the discontinuous reinforcing fiber is weakened by heating, and thus the residual stress of the reinforcing fiber is released and the expansion is caused by springback. The expansion not only allows voids to be formed in the core component but also usually allows clusters to be formed.

The expansion ratio in the step [3] is preferably from 1.1 to 8, more preferably from 1.5 to 4. An expansion ratio of smaller than 1.1 readily leads to a reduced effect of lightening the sandwich structure and, on the other hand, when the expansion ratio is larger than 8, the stiffness of the sandwich structure readily be low.

Moreover, the sandwich structure of the invention is preferred because its lightweight and stiffness can be utilized when it is integrated with another member to form an integrally formed article. In this case, an integrally formed article obtained by joining a first member made of the sandwich structure and a second member made of another formed article can be obtained.

Such a second member to be integrated is not particularly limited, and examples thereof include fiber-reinforced molding base materials such as unidirectional (UD) prepreg and woven prepreg, which are reinforced with a continuous reinforcing fiber, and glass mat-reinforced thermoplastic (GMT), sheet molding compound (SMC), and long fiber-reinforced prepreg, which are reinforced with a discontinuous reinforcing fiber, or a non-fiber-reinforced molding base material such as a resin sheet and a foam. Of these, a fiber-reinforced molding base material is preferred in view of the mechanical properties of a formed article to be obtained, and a continuous fiber-reinforced prepreg is preferably used in view of enhancing the effect of reinforcing the formed article, and a discontinuous fiber-reinforced prepreg, which has good shape-imparting property, is preferably used in the case of forming a formed article with a complicated shape.

The means for joining the first member and the second member together is not particularly limited, and examples thereof include (i) a method in which the first member and the second member are formed individually in advance and then they are joined together, and (ii) a method in which the first member is formed in advance, and then the second member is formed and at the same time the members are joined together. In an exemplary method of the (i), the first member is produced by press molding and the second member is produced by press molding or injection molding, and the members produced are joined together by a welding technique known in the art, such as hot plate welding, vibration welding, ultrasonic welding, laser welding, electric resistance welding, or induction welding. In an exemplary method of the (ii), the first member is produced by press molding and then inserted into a mold for injection molding, and then, the material for forming the second member is introduced into the mold for injection molding and thereby molded, and at the same time, the second member is joined to the first member by melting or softening the surface of the first member by the heat of the material in the molten or softened state. In another exemplary method of the (ii), the first member is produced by press molding and then placed in a mold for press molding, and then, the material for forming the second member is charged into the mold for press molding and then press molded to thereby accomplish the joining by the same principle as that described above. In view of mass productivity of the integrally formed article, the method of (ii) is preferably employed, and insert injection molding or outsert injection molding is preferably used as the injection molding and stamping molding or heat and cool molding is preferably used as the press molding.

Examples of the application of mounting members afforded by the sandwich structure of the invention and an integrally formed article made therefrom include: members of electric and electronic instruments, such as housings, trays, chassis, interior members and casings of personal computers, displays, OA equipments, cellular phones, portable information terminals, fax machines, compact disks, portable MDs, portable cassette radio players, PDAs (portable digital assistants such as electronic organizers), video camcorders, digital camcorders, optical instruments, audio devices, air conditioners, lighting devices, recreational goods, toys and other home electric appliances; civil engineering and construction parts such as columns, panels and reinforcing materials; components of suspensions, accelerators and steering wheels, such as various members, frames, hinges, arms, axle shafts, wheel bearings, beams, propeller shafts, wheels and gearboxes; components of outer plates and body parts, such as hoods, roofs, doors, fenders, trunk lids, side panels, rear-end panels, upper-back panels, front bodies and under bodies as well as various pillars, members, frames, beams, supports, rails and hinges; exterior parts such as bumpers, bumper beams, moldings, under-covers, engine covers, current plates, spoilers, cowl louvers and aero parts; interior parts such as instrument panels, seat frames, door trims, pillar trims, steering wheels and various modules; structural parts of automobiles and motorcycles such as components of fuel, exhaust and intake systems, including motor components, CNG tanks, gasoline tanks, fuel pumps, air-intakes, intake manifolds, carburetor main bodies and carburetor spacers as well as various pipes and valves; other components of automobiles and motorcycles such as alternator terminals, alternator connectors, IC regulators, potentiometer bases for light dimmers, engine coolant joints, air-conditioning thermostat bases, heater air flow control bulbs, brush holders for radiator motors, turbine vanes, wiper motor-related components, distributors, starter switches, starter relays, windshield washer fluid nozzles, air conditioner panel switch boards, fuel solenoid valve coils, battery trays, AT brackets, headlamp supports, pedal housings, protectors, horn terminals, step motor rotors, lamp sockets, lamp reflectors, lamp housings, brake pistons, noise shields, spare tire covers, solenoid bobbins, engine oil filters, ignition system casings, scuff plates and fascias; and aircraft components such as landing gear pods, winglets, spoilers, edges, ladders, elevators, fairings and ribs. In view of the mechanical properties, the mounting members are preferably used for automobile interior or exterior materials, housings of electric or electronic equipment, structural members of bicycles or sport equipment, aircraft interior finishing materials, or transportation packages. In particular, the mounting members are suitable for a module member constituted from a plurality of components.

EXAMPLES

The invention will be described more specifically below with reference to Examples. The materials (continuous reinforcing fiber, matrix resin, discontinuous reinforcing fiber, thermoplastic resin, foamed resin core component, resin for injection molding, and GMT) and the methods for measuring properties (flexural modulus of core component, volumetric specific gravity of core component, expansion ratio of core component, average of maximum lengths of clusters in core component, coverage with thermoplastic resin of discontinuous reinforcing fiber in core component, volume contents of discontinuous reinforcing fiber, thermoplastic resin, and voids in core component, maximum penetration distance of discontinuous reinforcing fiber in core component into skin member, stiffness of sandwich structure, and volumetric specific gravity of sandwich structure) used in Examples are described below. The environment for the preparation of carbon fiber and the environment for the evaluation of properties are both an atmosphere having a temperature of 25° C.±2° C. and a relative humidity of 50% unless otherwise stated. The invention is not to be limited by the Examples.

<Continuous Reinforcing Fiber>

Carbon fiber A (A copolymer composed of 99 mol % of acrylonitrile and 1 mol % of itaconic acid was spun and calcined, affording a carbon fiber having a total fiber count of 12,000, a specific gravity of 1.8, a strand tensile strength of 4.6 GPa, and a strand tensile modulus of 230 GPa. Subsequently, the carbon fiber was electrolytically surface treated at an amount of electricity of 3 coulombs per gram of the carbon fiber using a 0.05 mol/liter aqueous sulfuric acid solution as an electrolyte. The electrolytically surface treated carbon fiber was washed with water and then dried in hot air at a temperature of 150° C., affording a carbon fiber to be used as a raw material. In addition, a bisphenol A type epoxy resin ("jER" (registered trademark) 825 (produced by Japan Epoxy Resins Co., Ltd.) was mixed with acetone and dissolved homogeneously, and thus, an about 1% by mass acetone solution was obtained. This acetone solution was applied to the surface treated carbon fiber by an immersion method, followed by heat treatment at a temperature of 210° C. for 180 seconds, and thus a sizing agent-applied carbon fiber was obtained. The adhesion amount of the sizing agent was adjusted to 0.5 parts by mass relative to 100 parts by mass of the surface treated carbon fiber.)

Carbon fiber B (A copolymer composed of 99 mol % of acrylonitrile and 1 mol % of itaconic acid was spun and calcined, affording a carbon fiber having a total fiber count of 12,000, a specific gravity of 1.75, a strand tensile strength of 4.4 GPa, and a strand tensile modulus of 380 GPa. Subsequently, the carbon fiber was electrolytically surface treated at an amount of electricity of 110 coulombs per gram of the carbon fiber using a 0.05 mol/liter aqueous sulfuric acid solution as an electrolyte. The electrolytically surface treated carbon fiber was washed with water and then dried in hot air at a temperature of 150° C., affording a carbon fiber to be used as a raw material. In addition, a bisphenol A type epoxy resin ("jER" (registered trademark) 825 (produced by Japan Epoxy Resins Co., Ltd.) was mixed with acetone and dissolved homogeneously, and thus, an about 1% by mass acetone solution was obtained. This acetone solution was applied to the surface treated carbon fiber by an immersion method, followed by heat treatment at a temperature of 210° C. for 180 seconds, and thus a sizing agent-applied carbon fiber was obtained. The adhesion amount of the sizing agent was adjusted to 0.5 parts by mass relative to 100 parts by mass of the surface treated carbon fiber.)

Carbon fiber C (A copolymer composed of 99 mol % of acrylonitrile and 1 mol % of itaconic acid was spun and calcined, affording a carbon fiber having a total fiber count of 6,000, a specific gravity of 1.91, a strand tensile strength of 4.1 GPa, and a strand tensile modulus of 540 GPa. Subsequently, the carbon fiber was electrolytically surface treated at an amount of electricity of 5 coulombs per gram of the carbon fiber using a 0.05 mol/liter aqueous sulfuric acid solution as an electrolyte. The electrolytically surface treated carbon fiber was washed with water and then dried in hot air at a temperature of 150° C., affording a carbon fiber to be used as a raw material. In addition, a bisphenol A type epoxy resin ("jER" (registered trademark) 825 (produced by Japan Epoxy Resins Co., Ltd.) was mixed with acetone and dissolved homogeneously, and thus, an about 1% by mass acetone solution was obtained. This acetone solution was applied to the surface treated carbon fiber by an immersion method, followed by heat treatment at a temperature of 210° C. for 180 seconds, and thus a sizing agent-applied carbon fiber was obtained. The adhesion amount of the sizing agent was adjusted to 0.5 parts by mass relative to 100 parts by mass of the surface treated carbon fiber.)

<Matrix Resin>

Epoxy resin A (An epoxy resin was prepared using 35 parts by mass of a bisphenol F type epoxy resin ("jER" (registered trademark) 4007P (produced by Japan Epoxy Resins Co., Ltd.), 35 parts by mass of triglycidyl-p-aminophenol ("Araldite" (registered trademark) MY0510 (produced by Huntsman Advanced Materials LLC)), 30 parts by mass of a bisphenol F type epoxy resin ("EPICLON" (registered trademark) 830 (produced by DIC Corporation)), 5 parts by mass of dicyandiamides (a curing agent, DICY-7 (produced by Mitsubishi Chemical Corporation)), 3 parts by mass of polyvinyl formal ("VINYLEC" (registered trademark) PVF-K (produced by Chisso Corporation)), and 3 parts by mass of 3-(3,4-dichlorophenyl)-1,1-dimethylurea (a cure accelerator, DCMU99 (produced by Hodogaya Chemical Co., Ltd.)) as a curing auxiliary substance.)

Epoxy resin B (An epoxy resin was prepared using 40 parts by mass of a bisphenol F type epoxy resin ("jER" (registered trademark) 4007P (produced by Japan Epoxy Resins Co., Ltd.), 45 parts by mass of triglycidyl-p-aminophenol ("Araldite" (registered trademark) MY0510 (produced by Huntsman Advanced Materials LLC)), 15 parts by mass of a bisphenol F type epoxy resin ("EPICLON" (registered trademark) 830 (produced by DIC Corporation)), 5 parts by mass of dicyandiamides (a curing agent, DICY-7 (produced by Mitsubishi Chemical Corporation)), 3 parts by mass of polyvinyl formal ("VINYLEC" (registered trademark) PVF-K (produced by Chisso Corporation)), and 3 parts by mass of 3-(3,4-dichlorophenyl)-1,1-dimethylurea (a cure accelerator, DCMU99 (produced by Hodogaya Chemical Co., Ltd.)) as a curing auxiliary substance.)

<Discontinuous Reinforcing Fiber>

Discontinuous reinforcing fiber A (Carbon fiber A was cut with a cartridge cutter into a length of 6 mm, affording chopped reinforcing fibers. Then, 40 liters of dispersion medium having a surfactant concentration of 0.1% by mass and composed of water and a surfactant (polyoxyethylene lauryl ether (brand name) (produced by Nacalai Tesque, Inc.)) was prepared and the dispersion medium was fed to a paper-making device. The paper-making device was composed of an upper paper-making vessel (capacity: 30 liters) provided with a stirrer having a rotary blade and a lower water storage vessel (capacity: 10 liters), and a porous support was placed between the paper-making vessel and the water storage vessel. First, the dispersion medium was stirred with the stirrer until minute air bubbles were formed. Then, the chopped reinforcing fibers the mass of which was adjusted such that a desired basis weight would be achieved were fed to the dispersion medium containing the minute air bubbles dispersed therein, followed by stirring, and thus a slurry in which the reinforcing fibers were dispersed was obtained. Subsequently, the slurry was sucked from the water storage layer and water was removed through the porous support, thereby forming a reinforcing fiber web. The web was dried at 150° C. for 2 hours in a hot air dryer, and thus discontinuous reinforcing fiber A with a basis weight of 100 g/m² was obtained. The resulting discontinuous reinforcing fiber A contained 0% by mass of reinforcing fibers being more than 10 mm but less than 15 mm in length, 95% by mass of reinforcing fibers being from 2 mm to 10 mm in length, and 5% by mass of reinforcing fibers being less than 2 mm in length. Moreover, it contained 0% by mass of reinforcing fibers being more than 8 mm but less than 15 mm in length, 93% by mass of reinforcing fibers being from 3 mm to 8 mm in length, and 7% by mass of reinforcing fibers being less than 3 mm in length. The two-dimensional contact angle and the two-dimensional orientation angle were 40° and the degree of fiber dispersion was 90%.)

Discontinuous reinforcing fiber B (Discontinuous reinforcing fiber B having a basis weight of 100 g/m² was obtained in the same manner as the discontinuous reinforcing fiber A except that chopped reinforcing fibers were obtained by cutting carbon fiber A with a cartridge cutter into 3 mm. The resulting discontinuous reinforcing fiber B contained 0% by mass of reinforcing fibers being more than 10 mm but less than 15 mm in length, 95% by mass of reinforcing fibers being from 2 mm to 10 mm in length, and 5% by mass of reinforcing fibers being less than 2 mm in length. Moreover, it contained 0% by mass of reinforcing fibers being more than 8 mm but less than 15 mm in length, 93% by mass of reinforcing fibers being from 3 mm to 8 mm in length, and 7% by mass of reinforcing fibers being less than 3 mm in length. The two-dimensional contact angle and the two-dimensional orientation angle were 40° and the degree of fiber dispersion was 95%.)

Discontinuous reinforcing fiber C (Carbon fiber A was cut with a cartridge cutter into a length of 10 mm, affording chopped reinforcing fibers. The chopped reinforcing fibers were fed to a cotton opener and thus reinforcing fiber flocs containing almost no reinforcing fiber bundles with their original thickness were obtained. The reinforcing fiber flocs were fed to a carding device with a cylinder roll having a diameter of 600 mm, and thus sheet-like webs made of reinforcing fibers were formed. The rotation speed of the cylinder roll was 320 rpm and the speed of the doffer was 13 m/minute. The webs were stacked, so that discontinuous reinforcing fiber C having a basis weight of 100 g/m² was obtained. The resulting discontinuous reinforcing fiber C contained 20% by mass of reinforcing fibers being more than 10 mm but less than 15 mm in length, 75% by mass of reinforcing fibers being from 2 mm to 10 mm in length, and 5% by mass of reinforcing fibers being less than 2 mm in length. Moreover, it contained 83% by mass of reinforcing fibers being more than 8 mm but less than 15 mm in length, 10% by mass of reinforcing fibers being from 3 mm to 8 mm in length, and 7% by mass of reinforcing fibers being less than 3 mm in length. The two-dimensional contact angle and the two-dimensional orientation angle were 8° and the degree of fiber dispersion was 50%.)

Discontinuous reinforcing fiber D (Discontinuous reinforcing fiber D, which was the same as the chopped carbon fiber disclosed in Referential Example 2-1 of Patent Document 1 (WO 2006/028107) was used. The resulting discontinuous reinforcing fiber D contained 0% by mass of reinforcing fibers being more than 10 mm but less than 15 mm in length, 95% by mass of reinforcing fibers being from 2 mm to 10 mm in length, and 5% by mass of reinforcing fibers being less than 2 mm in length. Moreover, it contained 5% by mass of reinforcing fibers being more than 8 mm but less than 15 mm in length, 88% by mass of reinforcing fibers being from 3 mm to 8 mm in length, and 7% by mass of reinforcing fibers being less than 3 mm in length. The two-dimensional contact angle and the two-dimensional orientation angle were 40° and the degree of fiber dispersion was 90%.)

<Thermoplastic Resin>

Polypropylene (A film with a basis weight of 100 g/m² was prepared using a masterbatch prepared by mixing 90% by mass of an unmodified polypropylene ("Prime Polypro" (registered trademark) J106MG (produced by Prime Polymer Co., Ltd.)) and 10% by mass of an acid-modified polypropylene ("Admer" (registered trademark) QE800 (produced by Mitsui Chemicals, Inc.)). The melting point of the resin was 160° C.)

Polyamide 6 (A resin film with a basis weight of 124 g/m² made of "AMILAN" (registered trademark) CM1021T (produced by Toray Industries, Inc.)) was prepared. The melting point of the resin was 225° C.)

Polyamide 6 particles (particles of the same polyamide 6 as the polyamide 6 resin disclosed in Reference Example 2-1 of Patent Document 1 (WO 2006/028107)).

Polycarbonate (A resin film with a basis weight of 132 g/m² made of "Iupilon" (registered trademark) H-4000 (produced by Mitsubishi Engineering-Plastics Corporation)) was prepared. The glass transition point of the resin was 145° C.)

<Foamed Resin Core Component>

Non-crosslinked low-expanded polypropylene sheet "EFCELL" (registered trademark) (2 times in expansion ratio, 0.8 mm in thickness) (produced by Furukawa Electric Co., Ltd.)

<Resin for Injection Molding>

PC compound ("Panlite" (registered trademark) GXV-3545WI (produced by Teijin Chemicals Ltd.))

<GMT>

Glass fiber-reinforced polypropylene resin molding material (GMT) ("Unisheet" (registered trademark) P4038-BK31 (produced by Quadrant))

(1) Flexural Modulus of Core Component

Only a core component was cut out into a size of 50 mm in length and 25 mm in width (the thickness was the thickness of the whole core component) as a sample from a sandwich structure, and a flexural modulus was determined in accordance with ASTM D790 with a support span being adjusted to 16 times the specimen thickness.

(2) Volumetric Specific Gravity of Core Component

Only a core component was cut out into a size of 100 mm in width and 100 mm in length (the thickness was the thickness of the whole core component) as a sample from a sandwich structure, and a volumetric specific gravity was calculated from the mass W (g) and the apparent volume V (cm³) of the sample according to the following formula.

$$\text{Volumetric specific gravity} = W/V$$

(3) Expansion Ratio of Core Component

An expansion ratio was calculated from the thickness of a core component before expansion (the thickness of a precursor of the core component) $t_0$ and the thickness after expansion (the thickness of the core component) $t_1$ according to the following formula.

Expansion ratio=$t_1/t_0$ (4) Average of Maximum Lengths of Clusters in Core Component In a thickness direction section of a sandwich structure, three observation images of the core component portion were taken at different sites at a magnification of ×200 in a viewing range of 1.125 mm in length and 1.5 mm in width by using a laser microscope (VK-9510 (produced by KEYENCE Corporation)), and then ten clusters were selected arbitrarily from the individual observation images, and straight lines were drawn on the individual clusters and the maximum length was measured individually. Then, the average of the maximum lengths of the clusters was determined by averaging the measured maximum lengths of the ten clusters.

(5) Dispersion State of Discontinuous Reinforcing Fiber and Coverage with Thermoplastic Resin of Discontinuous Reinforcing Fiber in Core Component The thickness direction section of a core component was observed with a scanning electron microscope (SEM) (S-4800, (produced by Hitachi High-Technologies Corporation)), a photograph was taken at a magnification of ×1500, and arbitrary 50 points were extracted in cross sections of the discontinuous reinforcing fiber in the obtained image. In the individual cross sections of the discontinuous reinforcing fiber, the dispersion state of the discontinuous reinforcing fiber was observed, and at the same time, the coverage with the thermoplastic resin of the discontinuous reinforcing fiber was calculated according to the following formula from the peripheral length over which the thermoplastic resin covered (the peripheral length of the fiber of the portion covered with the thermoplastic resin) and the peripheral length over which the thermoplastic resin did not cover (the peripheral length of the fiber of the portion where the surface was exposed). When the thermoplastic resin adhered in a thickness equal to or more than Df/4 relative to the diameter Df of the discontinuous reinforcing fiber, the discontinuous reinforcing fiber was judged to be covered with the thermoplastic resin. When the cut section was not a perfect circle, the shortest straight distance passing the center of gravity of the sectional shape was defined as Df.

Coverage with thermoplastic resin of discontinuous reinforcing fiber (%)=(the peripheral length of the fiber of the portion covered with the thermoplastic resin)/(the peripheral length of the fiber of the portion covered with the thermoplastic resin+the peripheral length of the fiber of the portion where the surface was exposed)×100

(6) Volume Contents of Discontinuous Reinforcing Fibers, Thermoplastic Resin, and Voids in Core Component A core component was cut out from a sandwich structure into dimensions of 10 mm in width, 100 mm in length (and the thickness of the core component in thickness), and the volume contents of discontinuous reinforcing fibers, thermoplastic resin, and voids were measured by using an X-ray CT scanner (TDM-1300-FW (produced by Yamato Scientific Co., Ltd.)). The measurement was carried out at a spatial resolution of 0.7 μm.

(7) Maximum Penetration Distance into Skin Member of Discontinuous Reinforcing Fibers in Core Component A joint portion between a skin member and a core component of a sandwich structure was cut out and a cross section thereof in the thickness direction was photographed at arbitrary ten points (ten images) at a magnification of ×1000 by using a laser microscope (VK-9510 (produced by KEYENCE Corporation)), and from the images taken, a penetration distance was determined for each monofilament of the discontinuous reinforcing fibers of the core component penetrating into the skin member and the maximum value thereof was defined as a maximum penetration distance.

(8) Stiffness of Sandwich Structure

A sample of 140 mm in width and 110 mm in length (the thickness was the thickness of the whole sandwich structure) was cut out from a sandwich structure and was stuck to an aluminum alloy jig having an outer frame being 140 mm wide and 110 mm long and an inner frame being 100 mm wide and 70 mm long with a double-sided tape, and then the amount of deflection of the sandwich structure when a force of 20 N was applied was evaluated.

(9) Volumetric Specific Gravity of Sandwich Structure

A sample of 100 mm in width and 100 mm in length (the thickness was the thickness of the whole sandwich structure) was cut out from a sandwich structure, and a volumetric specific gravity was calculated from the mass Ws (g) and the apparent volume Vs ($cm^3$) of the sample according to the following formula.

Volumetric specific gravity=$Ws/Vs$

Example 1

Two resin films having a basis weight of 16.1 g/m² were prepared by applying epoxy resin A to release sheets with a knife coater. Then, the two resin films prepared above were stacked on both sides of carbon fiber A aligned unidirectionally in a sheet form, respectively, and the carbon fiber was impregnated with the resin by adding heat and pressure, so that a unidirectional prepreg in which the basis weight of the carbon fiber A was 75 g/m² and the mass fraction of the matrix resin was 30.0% was prepared and was used as a skin member. Moreover, an impregnated core component was prepared as a core component by heating two films of polypropylene resin and one discontinuous reinforcing fiber A together at a temperature of 180° C. (that is, the melting point of the resin (160° C.)+20° C.) and adding a pressure of 3 MPa, thereby impregnating the carbon fiber with the resin. The skin members and the core component were stacked successively in a manner [prepreg 90°/prepreg 0°/impregnated core component/prepreg 0°/prepreg 90° ], and then curing of the prepregs of the skin members and joining of the skin members with the core component were performed at 150° C. and 1 MPa for 30 minutes. Then, the materials were held at 180° C. for 5 minutes, thereby foaming the core component, and then the core component was hardened by cooling at 100° C. with a 1-mm spacer being sandwiched between tool plates, and thus a sandwich structure was obtained. The resulting sandwich structure was 1 mm in thickness.

Figure 4:
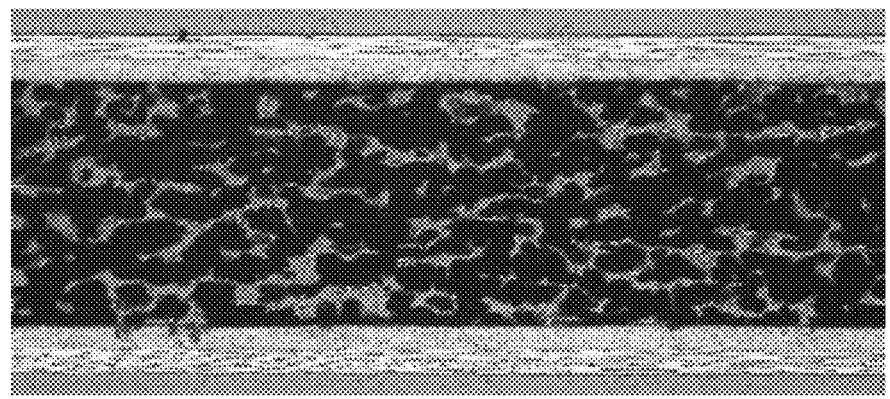
FIG. 4 shows a photograph of a section of the sandwich structure produced in Example 1.

Using the sandwich structure obtained, its properties were evaluated. The evaluated results are given in Table 1. A photograph of the sandwich structure of this Example taken with a laser microscope is shown in FIG. 4.

Examples 2 to 6

A sandwich structure was obtained in the same manner as Example 1 except that the continuous reinforcing fiber and the matrix resin in the skin members and the discontinuous reinforcing fiber and the thermoplastic resin in the core component were changed as shown in Table 1. The resulting sandwich structure was 1 mm in thickness. Using the sandwich structure obtained, its properties were evaluated. The evaluated results are given in Table 1.

Example 7

A sandwich structure was obtained in the same manner as Example 1 except that the continuous reinforcing fiber and the matrix resin in the skin members and the discontinuous reinforcing fiber and the thermoplastic resin in the core component were changed as shown in Table 1 and an impregnated core component was prepared using two films of polyamide 6 resin and one discontinuous reinforcing fiber A as a core component at a temperature of 250° C. (that is, the melting point of the resin (225° C.)+25° C.). The resulting sandwich structure was 1 mm in thickness. Using the sandwich structure obtained, its properties were evaluated. The evaluated results are given in Table 1.

Example 8

A sandwich structure was obtained in the same manner as Example 1 except that the continuous reinforcing fiber and the matrix resin in the skin members and the discontinuous reinforcing fiber and the thermoplastic resin in the core component were changed as shown in Table 1 and an impregnated core component was prepared using two films of polycarbonate resin and one discontinuous reinforcing fiber A as a core component at a temperature of 290° C. (that is, the glass transition point of the resin (145° C.)+145° C.). The resulting sandwich structure was 1 mm in thickness. Using the sandwich structure obtained, its properties were evaluated. The evaluated results are given in Table 1.

Example 9

A sandwich structure was obtained in the same manner as Example 3 except that the discontinuous reinforcing fiber and the thermoplastic resin in the core component were changed as shown in Table 1 and the size of the spacer was changed to 0.8 mm. The resulting sandwich structure was 0.8 mm in thickness. Using the sandwich structure obtained, its properties were evaluated. The evaluated results are given in Table 1.

Example 10

A sandwich structure was obtained in the same manner as Example 3 except that the discontinuous reinforcing fiber and the thermoplastic resin in the core component were changed as shown in Table 1 and the size of the spacer was changed to 0.6 mm. The resulting sandwich structure was 0.6 mm in thickness. Using the sandwich structure obtained, its properties were evaluated. The evaluated results are given in Table 1.

Comparative Example 1

An unidirectional prepreg prepared in the same manner as Example 1 except that the continuous reinforcing fiber and the matrix resin in the skin member were changed as shown in Table 2 was used, and a core component described in Referential Example 2-1 of Patent Document 1 adjusted to have thickness of 0.74 mm was used as a core component. The skin members and the core component were stacked successively in a manner [prepreg 90°/prepreg 0°/core component/prepreg 0°/prepreg 90° ], and then curing of the prepregs of the skin members and joining of the skin members with the core component were performed at 150° C. and 1 MPa for 30 minutes with a 1-mm spacer being sandwiched between tool plates. Thus, a sandwich structure was obtained. The resulting sandwich structure was 1 mm in thickness. Using the sandwich structure obtained, its properties were evaluated. The evaluated results are given in Table 2.

Comparative Example 2

A sandwich structure was obtained in the same manner as Comparative Example 1 except that the core component was changed to one in which the core component disclosed in Referential Example 2-2 of Patent Document 1 was adjusted to have a thickness of 0.74 mm. The resulting sandwich structure was 1 mm in thickness. Using the sandwich structure obtained, its properties were evaluated. The evaluated results are given in Table 2.

Comparative Example 3

A sandwich structure was obtained in the same manner as Comparative Example 1 except that the core component was changed to one obtained by cutting a non-crosslinked low-expanded polypropylene sheet "EFCELL" such that it would have a thickness of 0.74 mm. The resulting sandwich structure was 1 mm in thickness. Using the sandwich structure obtained, its properties were evaluated. The evaluated results are given in Table 2.

Comparative Example 4

A sandwich structure was obtained in the same manner as Example 1 except that four discontinuous reinforcing fiber A and eight films of the polypropylene resin as the thermoplastic resin were used in a core component. The resulting sandwich structure was 1.11 mm in thickness. Using the sandwich structure obtained, its properties were evaluated. The evaluated results are given in Table 2.

Comparative Example 5

A sandwich structure was obtained in the same manner as Comparative Example 1 except that the core component was prepared to have a thickness of 0.54 mm. The resulting sandwich structure was 0.8 mm thickness. Using the sandwich structure obtained, its properties were evaluated. The evaluated results are given in Table 2.

Comparative Example 6

A sandwich structure was obtained in the same manner as Comparative Example 1 except that the core component was prepared to have a thickness of 0.34 mm. The resulting sandwich structure was 0.6 mm in thickness. Using the sandwich structure obtained, its properties were evaluated. The evaluated results are given in Table 2.

Example 11

Figure 5:
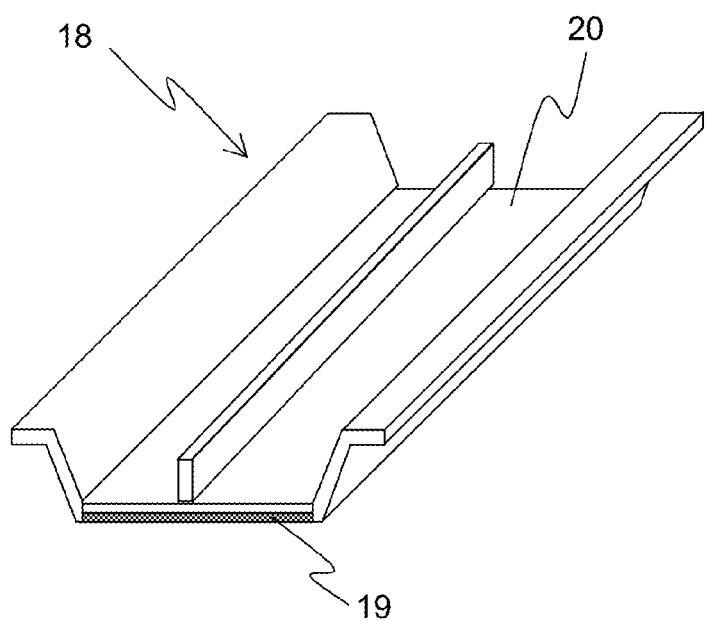
FIG. 5 shows a perspective view of an integrally formed article to be obtained in an Example of the invention.

A rectangular material of 250 mm in length and 160 mm in width was cut from the sandwich structure obtained in Example 1and this was designated as a first member. On the other hand, GMT as a second member was placed in a hot plate-heating type preheater which had preliminarily been held at 230° C., and the GMT was preheated for 1 minute with a pressure of 0.1 MPa applied. Subsequently, the first member was placed in a mold for press molding preheated at 120° C. and the GMT having been preheated was stacked thereon and the mold was closed. Then, the materials were held for 120 seconds with a pressure of 15 MPa applied. Thus, the first member and the second member were joined by press molding and an integrally formed article was obtained. The integrally formed article produced in this example was illustrated in FIG. 5.

Example 12

Figure 6:
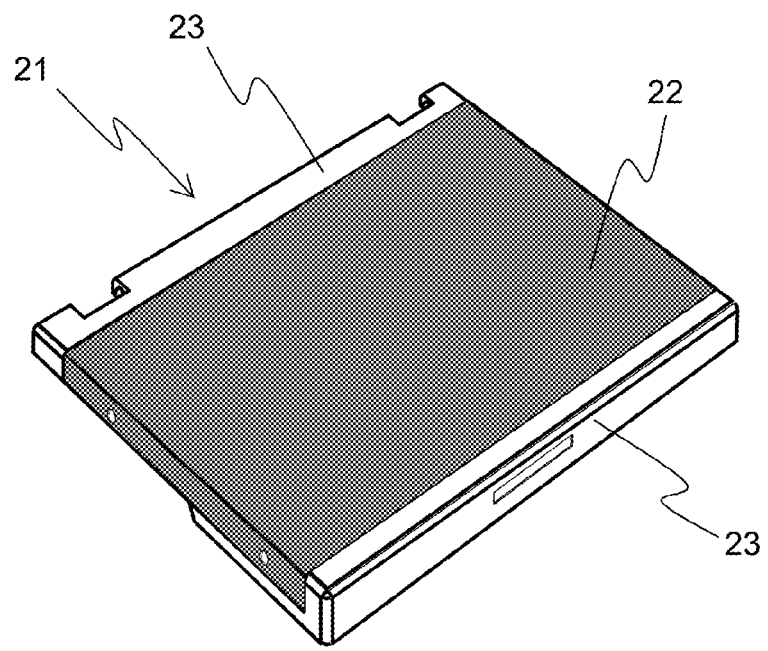
FIG. 6 shows a perspective view of an integrally formed article to be obtained in an Example of the invention.

A rectangular material of 250 mm in length and 160 mm in width was cut from the sandwich structure (300 mm in length and 300 mm in width) obtained in Example 1 and this was designated as a first member. On the other hand, a PC compound was used as a second member. Subsequently, the first member produced above was outserted to a mold for injection molding such that a side face of the sandwich structure would serve as a joining surface, and then the PC compound was injection molded as a second member. Thus, an integrally formed article was obtained. At this time, the cylinder temperature of the injection molding machine was 300° C. and the mold temperature was 60° C. The integrally formed article produced in this example was illustrated in FIG. 6.

TABLE 1

| | Type of skin member | | Materials and properties of core component | | | | | |
|---|---|---|---|---|---|---|---|---|
| Example | Continuous reinforcing fiber | Matrix resin | Discontinuous reinforcing fiber | Thermoplastic resin | Flexural modulus (GPa) | Volumetric specific gravity | Expansion ratio (times) | Average of maximum lengths of clusters (μm) |
| 1 | Carbon fiber A | Epoxy resin A | Discontinuous reinforcing fiber A | Polypropylene | 3.5 | 0.4 | 2.6 | 120 |
| 2 | Carbon fiber B | Epoxy resin A | Discontinuous reinforcing fiber A | Polypropylene | 4.9 | 0.4 | 2.5 | 210 |
| 3 | Carbon fiber C | Epoxy resin A | Discontinuous reinforcing fiber A | Polypropylene | 4.9 | 0.4 | 2.5 | 310 |
| 4 | Carbon fiber A | Epoxy resin B | Discontinuous reinforcing fiber A | Polypropylene | 3.5 | 0.4 | 2.6 | 90 |
| 5 | Carbon fiber A | Epoxy resin A | Discontinuous reinforcing fiber B | Polypropylene | 3.5 | 0.4 | 2.6 | 90 |
| 6 | Carbon fiber A | Epoxy resin A | Discontinuous reinforcing fiber C | Polypropylene | 3.5 | 0.4 | 2.6 | 85 |
| 7 | Carbon fiber A | Epoxy resin A | Discontinuous reinforcing fiber A | Polyamide 6 | 2.9 | 0.3 | 3.1 | 120 |
| 8 | Carbon fiber A | Epoxy resin A | Discontinuous reinforcing fiber A | Polycarbonate | 2.7 | 0.3 | 3.3 | 80 |
| 9 | Carbon fiber C | Epoxy resin A | Discontinuous reinforcing fiber A | Polypropylene | 5.5 | 0.5 | 2.1 | 320 |
| 10 | Carbon fiber C | Epoxy resin A | Discontinuous reinforcing fiber A | Polypropylene | 9.3 | 0.8 | 1.3 | 400 |

| | Materials and properties of core component | | | | | Properties of sandwich structure | |
|---|---|---|---|---|---|---|---|
| Example | Coverage with thermoplastic resin of discontinuous reinforcing fiber (%) | Volume content of discontinuous reinforcing fiber (%) | Volume content of thermoplastic resin (%) | Volume content of voids (%) | Maximum penetration distance into skin member of discontinuous reinforcing fiber in core component (μm) | Stiffness (amount of deflection) (mm) | Volumetric specific gravity |
| 1 | 40 | 7.7 | 30.8 | 62 | 7 | 0.299 | 0.73 |
| 2 | 60 | 8 | 32 | 60 | 10 | 0.282 | 0.73 |
| 3 | 85 | 8 | 32 | 60 | 15 | 0.276 | 0.73 |
| 4 | 35 | 7.7 | 30.8 | 62 | 3 | 0.302 | 0.72 |
| 5 | 35 | 7.7 | 30.8 | 62 | 4 | 0.302 | 0.72 |
| 6 | 40 | 7.7 | 30.8 | 62 | 3 | 0.303 | 0.72 |
| 7 | 80 | 6.5 | 25.8 | 68 | 5 | 0.292 | 0.65 |
| 8 | 80 | 6.1 | 24.2 | 70 | 8 | 0.291 | 0.62 |
| 9 | 85 | 9.5 | 38.1 | 52 | 10 | 0.435 | 0.86 |
| 10 | 85 | 15.4 | 61.5 | 23 | 12 | 0.612 | 1.13 |

TABLE 2

| | Sandwich structure | | | | | | | |
|---|---|---|---|---|---|---|---|---|
| | Materials and properties of core component | | | | | | | |
| | Material of skin member | | | | Flexural | | Expansion | Average of maximum lengths |
| Comparative Example | Continuous reinforcing fiber | Matrix resin | Discontinuous reinforcing fiber | Thermoplastic resin | modulus (GPa) | Volumetric specific gravity | ratio (times) | of clusters (μm) |
| 1 | Carbon fiber A | Epoxy resin A | Discontinuous reinforcing fiber D | Polyamide 6 particle | 0.7 | 0.25 | 4.3 | 45 |
| 2 | Carbon fiber A | Epoxy resin A | Discontinuous reinforcing fiber D | Polyamide 6 particle | 1 | 0.27 | 4 | 50 |
| 3 | Carbon fiber A | Epoxy resin A | Foamed polypropylene sheet | | — | 0.53 | 2 | — |
| 4 | Carbon fiber A | Epoxy resin A | Discontinuous reinforcing fiber A | Polypropylene | 14 | 1.06 | 1 | — |
| 5 | Carbon fiber A | Epoxy resin A | Discontinuous reinforcing fiber D | Polyamide 6 particle | 0.7 | 0.25 | 4.3 | 45 |
| 6 | Carbon fiber A | Epoxy resin A | Discontinuous reinforcing fiber D | Polyamide 6 particle | 0.7 | 0.25 | 4.3 | 45 |

| | Sandwich structure | | | | | | |
|---|---|---|---|---|---|---|---|
| | Materials and properties of core component | | | | Maximum penetration distance into skin | Properties of sandwich structure | |
| Comparative Example | Coverage with thermoplastic resin of discontinuous reinforcing fiber(%) | Volume content of discontinuous reinforcing fiber (%) | Volume content of thermoplastic resin (%) | Volume content of voids (%) | member of discontinuous reinforcing fiber in core component (μm) | Stiffness (amount of deflection) (mm) | Volumetric specific gravity |
| 1 | 25 | 4.7 | 18.6 | 76.7 | 1 | 0.352 | 0.52 |
| 2 | 15 | 5 | 20 | 75 | 2 | 0.331 | 0.54 |
| 3 | — | — | — | — | — | 0.321 | 0.84 |
| 4 | 99 | 20 | 80 | 0 | 5 | 0.111 | 1.3 |
| 5 | 25 | 4.7 | 18.6 | 76.7 | 1 | 0.512 | 0.86 |
| 6 | 25 | 4.7 | 18.6 | 76.7 | 1 | 0.731 | 1.13 |

In the Examples and Comparative Examples 1, 2, 5 and 6, monofilaments of discontinuous reinforcing fibers intersected one another via thermoplastic resin and a cluster was observed in a core component, and in Comparative Examples 3 and 4, no clusters were observed in a core component.

The comparison of Examples 1 to 8 with Comparative Examples 1 to 4, Example 9 with Comparative Example 5, and Example 10 with Comparative Example 6 shows that the sandwich structure of the invention is excellent in lightweight and stiffness due to the use of a specific core component and a skin member for a fiber-reinforced material.

In Example 11, an integrally formed article with good joint state was obtained successfully due to use of the sandwich structure of Example 1 as the first member and molding the second member by press molding. In Example 12, an integrally formed article with good joint state was obtained successfully due to use of the sandwich structure of Example 1 as the first member and molding the second member by injection molding. This is because the sandwich structure had voids and thus the PC compound of the injected material entered into the voids of the sandwich structure, and as a result, an anchor effect was developed and an integrally formed article strongly joined was able to be obtained.

INDUSTRIAL APPLICABILITY

The sandwich structure or the integrally formed article of the invention can make lightweight, thinness, and stiffness excellent. Use of the sandwich structure of the invention makes it possible to easily mold an integrally formed article by joining it with another member. Thus, the sandwich structure or the integrally formed article of the invention can be used suitably for a wide variety of applications, such as automobile interior or exterior material, housing of electric or electronic equipment, structural member of a bicycle or sport equipment, aircraft interior finishing material, and transportation package.

DESCRIPTION OF REFERENCE SIGNS

1: Cluster
2, 3, 4: Straight line in cluster
5: Sandwich structure
6: Thermoplastic resin of core component
7: Matrix resin of skin member 8: Discontinuous reinforcing fiber penetrating matrix resin
9: Penetration distance into skin member of discontinuous reinforcing fibers of core component
10, 11, 12, 13, 14, 15, 16: Discontinuous reinforcing fiber (monofilament) of core component
17: Two-dimensional contact angle, two-dimensional orientation angle
18, 21: Integrated formed article
19, 22: Sandwich structure
20, 23: Second member

The invention claimed is:

1. A sandwich structure formed from a core component comprising a discontinuous reinforcing fiber, a thermoplastic resin and voids, and a skin member comprising a continuous reinforcing fiber and a matrix resin,
wherein the core component is obtained by applying the thermoplastic resin in the form of a film or nonwoven fabric to the discontinuous reinforcing fiber by:
heating the thermoplastic resin to melt or soften, and impregnating the discontinuous reinforcing fiber with the thermoplastic resin by applying pressure; and
wherein in the core component, 30% or more of the discontinuous reinforcing fiber is covered with the thermoplastic resin, and monofilaments of the discontinuous reinforcing fiber intersect one another via the thermoplastic resin;
wherein the discontinuous reinforcing fiber and the thermoplastic resin form clusters in a size defined by an average of maximum length of 100 μm or more in the core component;
wherein a flexural modulus of the core component is 2.5 GPa to 20 GPa.

2. The sandwich structure according to claim 1, wherein the average of maximum length of the clusters is 200 pm or more.

3. The sandwich structure according to claim 1, wherein the volumetric specific gravity of the core component is 0.01 to 0.6.

4. The sandwich structure according to claim 1, wherein the continuous reinforcing fiber in the skin member is a continuous carbon fiber.

5. The sandwich structure according to claim 1, wherein the tensile modulus of the continuous reinforcing fibers in the skin member is 360 GPa to 1000 GPa.

6. The sandwich structure according to claim 1, wherein the discontinuous reinforcing fiber in the core component is a discontinuous carbon fiber.

7. The sandwich structure according to claim 1, wherein part of the discontinuous reinforcing fiber in the core component penetrates the skin component and the maximum penetration distance of the discontinuous reinforcing fiber into the skin component is 5 pm or more.

8. The sandwich structure according to claim 1, wherein the thermoplastic resin in the core component is at least one selected from the group consisting of polyolefin, polyamide, polyester, polycarbonate, polystyrene, modified polyphenylene ether, polyarylene sulfide, and polyether ether ketone.

9. An integrally formed article obtained by joining a first member made of the sandwich structure according to claim 1 and a second member made of another formed article.

10. A method for producing the sandwich structure according to claim 1 comprising the following steps [1] to [3]:
step [1]: a step of forming a precursor of a core component by impregnating the discontinuous reinforcing fiber with the thermoplastic resin by applying pressure in a state where the thermoplastic resin is heated at a temperature at which the thermoplastic resin melts or softens,
step [2]: a step of forming a skin component from a continuous reinforcing fiber and a matrix resin,
step [3]: a step of forming the core component by expanding the precursor of the core component by adjusting the thickness thereof so that the precursor of the core component has a prescribed expansion ratio in a heated state.

11. The method for producing the sandwich structure according to claim 10, wherein the expansion ratio is 1.1 to 8.

* * * * *